Nov. 18, 1952  C. R. OSWIN  2,618,575
PRODUCTION OF MOISTUREPROOF SHEET WRAPPING MATERIAL
Filed Oct. 10, 1949  2 SHEETS—SHEET 1
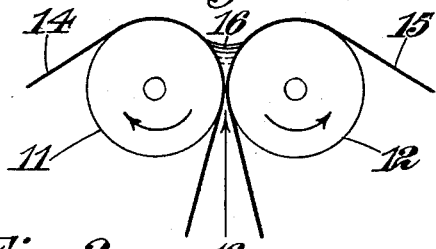
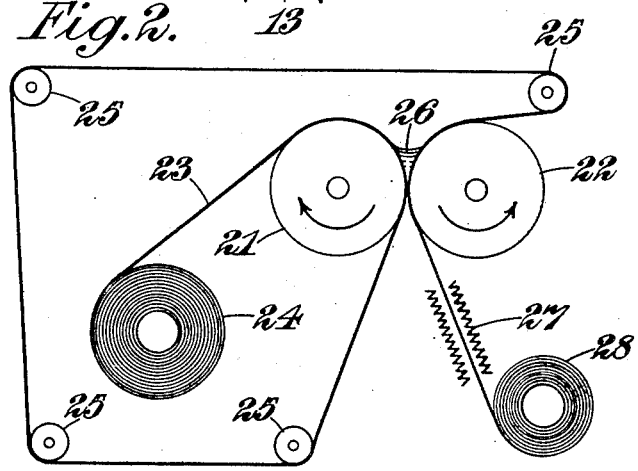
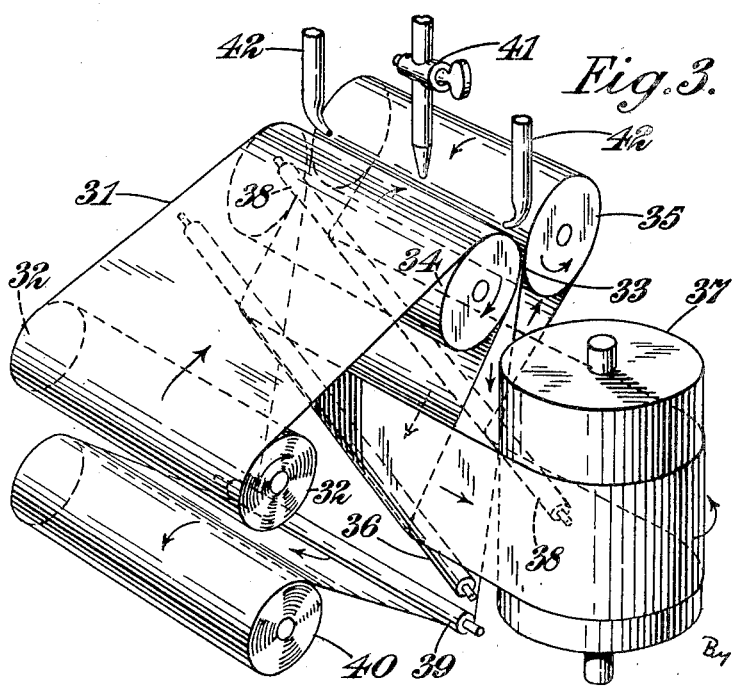
INVENTOR
Charles R. Oswin
By Watson, Cole, Grindle & Watson

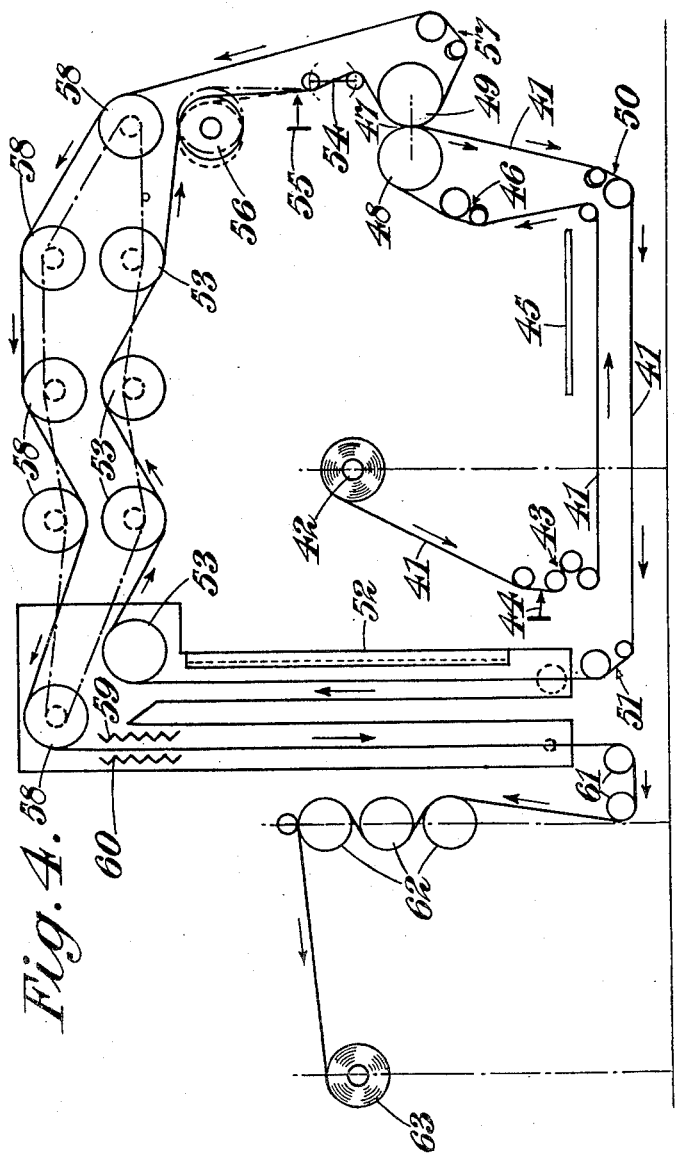

Patented Nov. 18, 1952

2,618,575

UNITED STATES PATENT OFFICE 2,618,575

PRODUCTION OF MOISTUREPROOF SHEET WRAPPING MATERIAL

Charles Robert Oswin, Burrington, England, assignor to British Cellophane Limited, Bridgwater, Somerset, England, a British company Application October 10, 1949, Serial No. 120,573
In Great Britain October 22, 1948

5 Claims. (Cl. 117—68)

This invention consists of improvements in or relating to the production of moistureproof sheet wrapping materials.

Coatings of vinylidene chloride/acrylontrile copolymers have excellent moistureproofness when the vinylidene chloride content of the mixture from which the copolymer is formed ranges between 90% and 95%. However, these copolymers formed from mixtures of high vinylidene chloride content are soluble in the usual coating solvents only at temperatures of 50° C. or higher, and thus cannot be applied at normal operating temperatures. Moreover, for this type of coating, higher drying temperatures are necessary. Thus, when volatile softeners, such as ethylene glycol, are used for the softening of the base sheet, the loss of softener is increased, whereby operating costs are raised.

To overcome this disadvantage, it has already been proposed to employ an aqueous dispersion of vinylidene chloride/acrylonitrile copolymer formed from a mixture of high vinylidene chloride content in place of a solution thereof. However, this proposal has not met with complete success hitherto, because of the tendency of the aqueous dispersion to "break" or coagulate under shearing stress. Thus, it has been found that when regenerated cellulose sheet, coated with a coating of an aqueous dispersion of vinylidene chloride/acrylonitrile copolymer formed with a mixture of high vinylidene chloride content, is drawn through doctor rolls to regulate the thickness of coating to be applied, the dispersion of the applied coating becomes unstable, and the copolymer is deposited progressively upon the dry rolls as a hard, difficultly removable deposit.

It has now been discovered that satisfactory results in the moistureproofing of sheet of watersensitive non-fibrous organic material by means of an aqueous dispersion of vinylidene chloride/acrylonitrile copolymer formed from a mixture of high vinylidene chloride content may be achieved if the dispersion is offered simultaneously to two surfaces of the sheet or sheets in the form of a nip of controlled width and if the two surfaces are separated again before the sheet has had time to imbibe any appreciable amount of water from the dispersion. Each of the separated sheets then carries a liquid coating of predetermined thickness and of sufficiently low viscosity to level itself to a smooth coating.

According to the present invention there is provided a process for applying a moistureproof layer of vinylidene chloride/acrylonitrile copolymer to the surface of a sheet of water-sensitive organic, non-fibrous material, which process comprises introducing into the nip formed between two surfaces of the sheet or sheets to be coated an aqueous dispersion of the said copolymer and separating the two surfaces, each with its coating, in a time less than the time of imbibition of either of the two surfaces.

Sheets of water-sensitive non-fibrous material are characterised in that they absorb water when they are brought into contact with water or water-vapour; in so doing they tend to change their dimensions. The nip is formed between the two convex surfaces of the sheet or sheets to be coated. The two convex surfaces of the sheet or sheets to be coated are in the shape of sectors of adjacent cylinders, the axes of which are parallel and in the same horizontal plane.

The nip is formed between the two surfaces of the film or films to be coated. The two surfaces of the film or films to be coated are in the shape of sectors of adjacent cylinders, the axes of which are parallel and in the same horizontal plane.

The two surfaces of the sheet or sheets to be coated may be surfaces of separate webs which are each coated simultaneously on one side. In the preferred form of the invention, however, the two surfaces to be coated are the opposite surfaces of a single web.

When liquid water is brought into contact with sheets of water-sensitive non-fibrous material, the initial rate of absorption of water by the sheet is slow, and a short but finite time elapses before the sheet has imbibed sufficient water to cause it to suffer an appreciable change in physical properties. In the present specification, the finite time that elapses before the sheet has imbibed water from the aqueous dispersion applied thereto is known as the "time of imbibition." It will be appreciated that absorption of water from the aqueous dispersion changes the physical characteristics of the latter.

As the sheet of water-sensitive non-fibrous organic material, it is preferred to use any smooth, dense, substantially non-porous, non-fibrous sheet of regenerated cellulose produced from viscose, cuprammonium cellulose, or any other aqueous solutions or dispersions of cellulose. Sheets of alginic acid derivatives, or of protein such as gelatine or casein, or of lowly substituted cellulose ether or of lowly substituted cellulose ester, or of polyvinyl alcohol, may alternatively be employed.

The aqueous dispersion of vinylidene chloride/acrylonitrile copolymer may be produced by the process described in United States patent application Serial No. 12,564 filed March 2, 1948, now abandoned, which process comprises the steps of emulsifying a mixture of monomeric vinylidene chloride and monomeric acrylonitrile, in the ratio of more than 75 parts by weight of vinylidene chloride to 25 parts by weight of acrylonitrile, in an aqueous medium containing, as dispersing agent, in the proportion of from 0.5% to 8.0% by weight, based on the initial weight of the mixture of monomeric vinylidene chloride and monomeric acrylonitrile, a water-dispersible condensation product of formaldehyde with a naphthalene sulphonic acid or with an alkali metal salt or ammonium salt thereof, or with an alkyl substituted naphthalene sulphonic acid or with an alkali metal salt or ammonium salt thereof, wherein the alkyl group contains 1, 2, 3 or 4 carbon atoms in the molecule, and maintaining the resulting emulsion at a temperature at which polymerisation takes place, until polymerisation is substantially complete. The ratio of monomeric vinylidene chloride to monomeric acrylonitrile in the mixture may be as high as 96:4, a 92:8 ratio of monomeric vinylidene chloride to monomeric acrylonitrile being preferred.

The solid vinylidene chloride/acrylonitrile copolymer content of the aqueous dispersion may range from 17% to 65%, a content comprised within the range of 40% to 55% generally giving the best results. The viscosity of the dispersion, measured at 20° C., should not exceed 25 centipoises, and preferably should be within the range of 16 to 25 centipoises.

Preferably, in applying the vinylidene chloride/acrylonitrile copolymer to the surface of the sheet, the amount of dispersion in contact with the surface of the sheet is controlled so that there is a small reservoir of the dispersion at the nip. The dispersion may be added continuously to the reservoir at a rate such that the rate of addition of the dispersion to the reservoir is approximately equal to the rate of removal of the dispersion by the surface-coated sheet therefrom.

Spreading of the dispersion past the edges of the sheet is undesirable, and may be restrained, either by fitting small flexible dams, such as rubber wedges, at the otherwise laterally unsupported edges of the coating liquid, or preferably by directing a jet of air against each edge of the coating liquid, so as to prevent overflowing of the edges of the sheet.

The nip formed by the sheet surfaces is supported by two parallel rollers, preferably of the same diameter, and rotating about horizontal axes. The rollers, which should be smooth and polished, may be made of any suitable hard material, such as brass or stainless steel. The gap between the rollers at the nip is adjustable, so as to control the thickness of coating applied to the sheet. The speed of rotation of the rollers is controlled so that the time which elapses between the instant of first contact of a point on the advancing sheet with the dispersion and the instant of separation of the coated sheets at that point is less than the time of imbibition of water from the aqueous dispersion of vinylidene chloride/acrylonitrile copolymer by the sheet of water-sensitive organic, non-fibrous material.

Approximate values of the times of imbibition of water by sheets of some of the commoner water-sensitive, organic, non-fibrous materials of water from the aqueous dispersion, applied at a temperature of about 20° C. to the surface of the sheet, are shown, for guidance, in Table I below.

TABLE I

*Time of imbibition of water from an aqueous dispersion of vinylidene chloride/acrylonitrile copolymer by sheets of the commoner water-sensitive organic non-fibrous materials. (20° C.)*

| | Secs. |
|---|---|
| Regenerated cellulose sheets, plain transparent, grade 300 | ½ to 2 |
| Regenerated cellulose sheets, plain transparent, grade 600 | 1 to 3 |
| Gelatine sheets, cast, 0.004 inch thick | Longer than 2 |
| Alginic acid derivative sheet, 0.001 inch thick | ½ to 1½ |

After separation of the coated surfaces, the absorbed water is removed from the coated sheet, preferably by evaporation by heat, and a coating is then applied, in the same way to that just described, to the reverse (uncoated) side of the sheet. After the water has been removed from the second coating, both coatings are subjected to heat at a temperature sufficiently high to fuse together the particles of copolymer deposited from the dispersion. If desired, each coating may be fused separately immediately after application, but this procedure is unnecessary.

It is not, of course, necessary to coat both sides of the sheet in order to obtain a water-vapour barrier, but it is desirable to do so in order to prevent curling of the coated sheet.

The sheet of water-sensitive non-fibrous organic material may be in the form of cut sheets or of continuous webs. In order to prevent contact between the dispersion and the surface of the rollers, it is desirable to shut off the supply of dispersion to the reservoir before the end of the sheet is reached, so that the reservoir will be exhausted before the roller is uncovered.

The sheets which are coated simultaneously on one side should be of approximately the same width, since the flow of dispersion should be prevented from reaching the edges of the narrower web. It is advantageous to arrange that the two sheets shall be part of the same continuous web, because variations in width are thereby restricted.

The following are examples, by way of illustration and in no way of limitation, of the carrying out of the process in accordance with the invention by means of apparatus shown diagrammatically by way of example in the accompanying drawings.

In the drawings:

Figure 1 shows diagrammatically the arrangement of a pair of rollers for the coating of a surface of each of two sheets by the process in accordance with the present invention.

Figure 2 is a diagrammatic view of an arrangement of apparatus for coating both sides of a sheet, Figure 3 is a diagrammatic perspective view of apparatus for coating a sheet on both sides, and Figure 4 is a diagrammatic end view of an alternative form of apparatus for coating both sides of a web of sheet material.

Parts and proportions referred to throughout this specification are parts and proportions by weight.

EXAMPLE I

Referring to Figure 1, two brass rollers 11 and 12, each 12" in length and 2" in diameter, are mounted with their axes horizontal and parallel. The gap 13 between the rollers 11 and 12 is adjusted to 0.003". Two sheets of regenerated cellulose sheet 14 and 15, each 0.00085 inch thick, and 10" wide, are fed through the nip and the rollers 11 and 12 are caused to rotate inwards at equal speeds. An aqueous dispersion containing 45% of vinylidene chloride/acrylonitrile copolymer (85:15) is fed into the nip at a rate of 0.001 cu. inch for each inch of travel of the roller peripheries, and by means of air jets (not shown) directed at points ¼ inch from the edges of the sheets the dispersion is retained in a small pool or reservoir 16, 9½ inches wide and not more than ¼ inch deep.

The distance of contact of the surfaces of the sheets with the dispersion before separation of the surfaces is about ½ inch and the peripheral speed of the rollers is 10 feet per minute. The time of imbibition of water from the aqueous dispersion by the sheets was 1½ seconds.

On emerging from the nip, the two sheets are separated, and subsequently dried by exposure to radiation from an electric fire for 5 seconds. The gap 13 between the rollers was then increased to 0.004 inch, the sheets reintroduced, but this time with their coated sides towards the nip rollers, and the copolymer dispersion is applied as before. After evaporation of the water, the coatings are fused by exposure to radiation from an electric fire for 15 seconds; a layer 0.00005 inch thick is left on each side of the sheet.

The moistureproof sheet wrapping materials thus produced are clear and free from streaks, and have a permeability value of 116.

EXAMPLE II

Referring to Figure 2, two rollers 21 and 22 are set up with a 0.003 inch gap as in Example I. A single sheet of regenerated cellulose film 23, 0.00085 inch thick, is fed through the nip from a roll 24, and is then passed over a series of rollers 25 and back into the nip. A reservoir 26 of aqueous vinylidene chloride/acrylonitrile dispersion (85:15) is kept in the nip by means of air jets (not shown). The two surfaces of the sheet, each with its liquid coating, are separated in a time less than the time of imbibition of water from the aqueous dispersion by either of the two surfaces. The sheet, coated with dispersion on both sides, is passed through an electric heater 27; a layer 0.00005 inch thick is left on each side of the sheet. The finished coated sheet is wound up on a roll 28.

The product is moistureproof sheet wrapping material which is clear and transparent, and which has a permeability value of 161.

EXAMPLE III

The process of Example I is carried out, except that one sheet is of regenerated cellulose and has a thickness of 0.00085 inch, and the second sheet is of alginic acid derivative and has a thickness of 0.001 inch. Both sheets were coated on both sides. The time of imbibition of water from the aqueous dispersion by the sheet of regenerated cellulose was 1½ seconds and by the sheet of alginic acid derivative was 1 second.

The moistureproof sheet wrapping materials thus produced, of regenerated cellulose and of alginic acid derivative, have permeability values of 180 and 290 respectively.

EXAMPLE IV

The process of Example III is carried out, except that the second sheet is of gelatine and has a thickness of 0.002 inch, and that the gap is increased to 0.004 inch for the first pass and 0.005 inch for the second pass. The finished sheets were clear and had permeability values of 170 and 240 respectively. The time of imbibition of water from the aqueous dispersion by the sheet of regenerated cellulose was 1½ seconds, and by the sheet of gelatine was 2½ seconds.

EXAMPLE V

Referring to Figure 3, a sheet of regenerated cellulose 31, 0.00085 inch thick and 4 inches wide, is fed from a roll 32 into a nip 33 between two steel rollers 34 and 35, of diameter 1¼ inches, rotating inwards at a speed of 30 R. P. M. A 25% aqueous dispersion of vinylidene chloride/acrylonitrile copolymer (85:15) is fed into the nip 33 from a tap 41 at a rate of 0.1 cu. inch per minute. The dispersion is prevented from flowing past the edges of the sheet 31 in the nip 33 by two air-jets 42 directed at the edges of the webs. Emerging from the nip 33, the sheet 31, coated on one side with the dispersion, passes over a thin roller 36 set at 45° to the vertical, which deflects the sheet into a horizontal path. The sheet, edge upwards, then passes with its coated side outwards, round a drum 37, back to another thin roller 38 set at 45° and up over the outside of the steel rollers 35. The uncoated side of the sheet 31 is thus presented into the nip 33, and is coated. The two surfaces, each with its liquid coating, are separated in a time less than the time of imbibition of water from the aqueous dispersion by either of the two surfaces. The sheet 31, now coated on both sides, passes downwards through a heating device (not shown) whereby the coating on each side of the film is fused leaving a layer 0.00005 inch thick on each side of the sheet. The finished coated film passes below roller 39 and is wound up on a roll 40.

The product is clear and transparent, moistureproof sheet wrapping material.

EXAMPLE VI

Referring to Figure 4, a web 41 of regenerated cellulose sheet passes from an unwind 42 to a nest of tension-regulating rolls 43. A tracking-device 44 keeps one edge of the web 41 in a constant position. The web 41 then passes under a platform 45, then over an expander roller 46 and into the nip 47 formed between two parallel rollers 48 and 49. The web 41, coated on one side with aqueous dispersion of vinylidene chloride/acrylonitrile (92:8) from the nip 37, passes over further expander rollers 50 and 51 and upwardly into a drying chamber 52, where its moisture content is reduced to a value lying between 5% and 7%, based on oven-dry weight. The dried web then passes over a series of rollers 53, through a tension-equalising device 54, back into nip 47, where its uncoated side comes into contact with the aqueous dispersion. A tracking device 55 operates the lateral motion of one end of the roller 56 to keep the edge of the coated web close to that of the uncoated web entering the nip 47. The two surfaces, each with its liquid coating, are separated in a time less than the time of imbibition of water from the aqueous dispersion by either of the two surfaces.

The distance of contact of the surfaces of the web with the dispersion before separation of the surfaces is about ½ inch, and the peripheral speed of the rollers is 10 feet per minute. The time of imbibition of water from the aqueous dispersion by the regenerated cellulose sheet was 1½ seconds.

After leaving the nip the sheet passes over expander rolls 57 and a series of rolls 58 into the top of the drying chamber 52 and thence between electric heaters 59 and 60 to fuse together the particles of copolymer deposited from the dispersion.

Finally the coated sheet leaves the drying and heating chamber and passes to winding roll 63 via rollers 61 and 62.

The product is moistureproof sheet wrapping material which is clear and transparent, and free from streaks.

The time of imbibition of water from the aqueous dispersion of vinylidene chloride/acrylonitrile copolymer by the sheet of a water-sensitive, organic, non-fibrous material is determined as follows: Two lengths of sheet of a similar nature are led, from opposed horizontal directions, into a nip formed by two parallel horizontal rollers rotating inwardly and downwardly. The two lengths of sheet pass downwards in contact until they reach a second nip formed between parallel rollers, and situated 6 inches below the first nip. The minimum distance between the rollers should be adjusted to between 1.1 and 1.5 times the combined thickness of the two lengths of sheet. On emerging from the second nip, the two lengths of sheet are separated, and are drawn away in opposite horizontal directions. The aqueous dispersion of vinylidene chloride/acrylonitrile copolymer is fed into the nip so as to maintain therein a pool of liquid not more than ¼ inch deep. At the start, the lengths of film are drawn slowly through the nips, at a speed not exceeding 3 feet per minute. On observing the coated lengths, it will be found that the separated surfaces are rough. The speed of withdrawal is then slowly increased in a controlled manner, until a critical speed is reached for which the separated surfaces, which have been rough for all slower speeds, have now become smooth, there being sufficient fluidity after separation for the liquid coated surfaces, disturbed at separation, to flow and become smooth. This critical speed of withdrawal is measured, and the time required for the lengths of sheet to pass, at that speed, over the measured distance from the first nip to the second nip is calculated. This calculated time is taken as the time of imbibition.

The "permeability value" was determined by the method of Church and Scroggie for measuring permeability, as described in "Paper Trade Journal" TAPPI section, October 3, 1935, pages 201–209.

I claim:

1. A process for applying a moistureproof layer of vinylidene chloride/acrylonitrile copolymer formed by the polymerisation of a mixture of monomeric vinylidene chloride and monomeric acrylonitrile present in the mixture in a ratio comprised between 3 parts by weight vinylidene chloride to 1 part by weight of acrylonitrile and 24 parts by weight of vinylidene chloride to 1 part by weight of acrylonitrile, to the surface of a sheet of water-sensitive, organic, non-fibrous material, which process comprises guiding a length of said sheet of said material into substantially parallel relation with another length of the same sheet of said material, said lengths of the sheet travelling along converging paths to provide a converging space between facing surfaces of the lengths of the sheet, feeding into the space between converging inner surfaces of said lengths of sheet an aqueous dispersion of the said copolymer and separating the two surfaces each with its coating, in a less time than the time of imbibition of water from the aqueous dispersion of the said copolymer through either of the two surfaces.

2. A process for applying a substantially uniform, continuous moistureproof layer of vinylidene chloride/acrylonitrile copolymer to the surface of a sheet of water-sensitive, organic non-fibrous absorbent material, which process comprises guiding a length of said sheet of said material into substantially parallel relation with another length of the same sheet of said material, said lengths of the sheet travelling along converging paths to provide a converging space between facing surfaces of the lengths of the sheet, feeding into the space between converging inner surfaces of said lengths of sheet a bulk of an aqueous dispersion of vinylidene chloride/acrylonitrile copolymer, formed by the polymerisation of a mixture of monomeric vinylidene chloride and monomeric acrylonitrile present in the mixture in a ratio comprised between 3 parts by weight of vinylidene chloride to 1 part by weight of acylonitrile and 24 parts by weight of vinylidene chloride to 1 part by weight of acrylonitrile, the copolymer content of the aqueous dispersion ranging from 17% to 65% by weight and the viscosity of said aqueous dispersion not exceeding 25 centipoises, said bulk of aqueous dispersion being of greater thickness than the desired thickness of spread liquid, supporting outer surfaces of said lengths of sheet during convergence to confine said bulk of aqueous dispersion, maintaining inner surfaces of lengths of the sheet predeterminedly spaced at the point of convergence thereof by liquid pressure created in said bulk of aqueous dispersion at the point of convergence by passage of said inner surfaces of said lengths of sheet past and in wetting contact with said bulk to create thereby a substantially uniform layer of said aqueous dispersion, separating the two lengths of the sheet after each surface has been coated on its inner surface with a coating of aqueous dispersion in a time less than the time of imbibition of water from the aqueous dispersion of the said copolymer through either of the two surfaces of said lengths of sheet but after such time as each of the coated lengths of sheet has removed from said coating a sufficient quantity of said dispersion absorbable by said sheet to form a layer such that said layer includes a substantially continuous solid phase of vinylidene chloride/acrylonitrile copolymer.

3. The process as set forth in claim 2, and subsequently removing the absorbed water from the coated sheet.

4. A process for applying a substantially uniform, continuous moistureproof layer of vinylidene chloride/acrylonitrile copolymer to the surface of a sheet of water-sensitive, organic non-fibrous absorbent material, which process comprises guiding said sheet of said material into substantially parallel relation with another sheet of said material, said sheets travelling along converging paths to provide a converging space between facing surfaces of said sheets, feeding into the space between converging inner surfaces of said sheets a bulk of an aqueous dispersion of vinylidene chloride/acrylonitrile copolymer, formed by the polymerisation of a mixture of monomeric vinylidene chloride and monomeric acrylonitrile present in the mixture in a ratio comprised between 3 parts by weight of vinylidene chloride to 1 part by weight of acrylonitrile and 24 parts by weight of vinylidene chloride to 1 part by weight of acrylonitrile, the copolymer content of the aqueous dispersion ranging from 17% to 65% by weight and the viscosity of said aqueous dispersion not exceeding 25 centipoises, said bulk of aqueous dispersion being of greater thickness than the desired thickness of spread liquid, supporting outer surfaces of said sheets during convergence to confine said bulk of aqueous dispersion, maintaining inner surfaces of said sheets predeterminedly spaced at the point of convergence thereof by liquid pressure created in said bulk of aqueous dispersion at the point of convergence by passage of said inner surfaces of said sheets past and in wetting contact with said bulk to create thereby a substantially uniform layer of said aqueous dispersion, separating the two sheets, after each has been coated on its inner surface with a coating of the aqueous dispersion, in a time less than the time of imbibition of water from the aqueous dispersion of said copolymer through either of the two surfaces of said sheets.

5. The process as set forth in claim 4, and subsequently removing the absorbed water from the said sheets.

CHARLES ROBERT OSWIN.

REFERENCES CITED

The following references are of record in the file of this patent:

UNITED STATES PATENTS

| Number | Name | Date |
|---|---|---|
| 4,353 | Goff | Jan. 15, 1846 |
| 1,405,198 | Frothingham | Jan. 31, 1922 |
| 2,404,779 | Arnold | July 30, 1946 |
| 2,404,817 | Strain | July 30, 1946 |
| 2,425,231 | Dickerman et al. | Aug. 5, 1947 |
| 2,457,083 | Jordan | Dec. 21, 1948 |